UNITED STATES PATENT OFFICE.

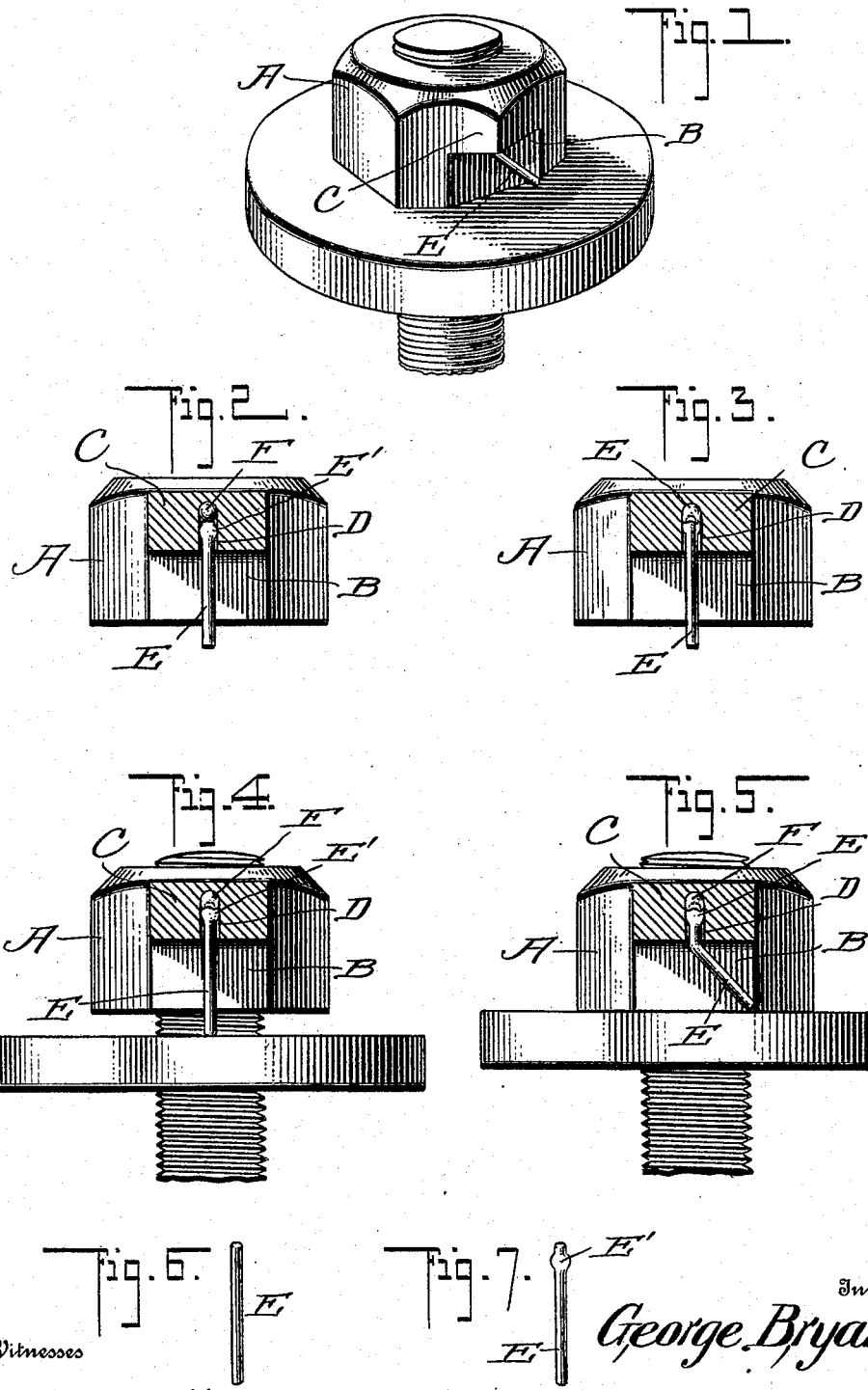

GEORGE BRYAR, OF BOSTON, MASSACHUSETTS.

NUT-LOCK.

942,194.

Specification of Letters Patent. Patented Dec. 7, 1909.

Application filed December 18, 1907, Serial No. 407,040. Renewed April 10, 1909. Serial No. 489,186.

*To all whom it may concern:*

Be it known that I, GEORGE BRYAR, a citizen of the United States, residing in Boston, in the county of Suffolk and State of Massachusetts, have invented a new and useful Improvement in Nut-Locks, of which the following is a specification.

This invention is an improved construction of nut lock which can be used upon railroad rails, bridge structures and the like, the object of the invention being to provide an exceedingly cheap and simple construction which will not only lock the nut when properly screwed down, but will hold the nut locked in case the washer or bolt should become worn, inasmuch as the spring locking means will continue to exert its locking force until all of the parts have been separated at least an eighth of an inch.

Another object of the invention is to provide a nut lock in which the locking member can be quickly and easily removed and replaced by a new one whenever desired.

With these objects in view, my invention consist in the special features of construction, hereinafter fully described and pointed out in the claim.

In the drawing forming a part of this specification:—Figure 1 is a perspective view showing a nut lock constructed in accordance with my invention, said nut being screwed down tight upon the washer. Fig. 2 is a sectional elevation showing the locking pin being inserted into the nut. Fig. 3 is a similar view showing said locking pin firmly secured. Fig. 4 is a sectional elevation showing the locked nut in process of being screwed down upon the washer, the end of the locking pin just barely contacting with the face of the washer. Fig. 5 is a view showing the nut screwed entirely down. Fig. 6 is a detail view of the locking pin before being swaged, and Fig. 7 is a detail view of said pin after being swaged.

In carrying out my invention I employ an ordinary nut A which I cut away at one corner for about one-half its thickness from the base as indicated at B, thereby providing a projecting shoulder-portion C which is bored vertically as shown at D, said bore extending nearly to the face of the nut.

E indicates a locking pin which is constructed of high-grade spring steel, the length of said pin being substantially equal to the thickness of the nut, and the diameter of said pin is substantially the same as the diameter of the bore D, the pin being a trifle smaller so that one end thereof can be slightly swaged as shown at E' in order to more securely fasten this end of the pin within the bore. In the drawing this swaged portion is somewhat exaggerated for the purposes of illustration, but it will be understood that the pin is only slightly swaged and fits snugly within the bore and for the purpose of more securely connecting the pin and nut I may insert a soft metal shot F within the bore before the pin is driven in, and as the pin is driven completely home, the shot will be crushed and completely surround the swaged end of the pin and thereby firmly fastening this end of the pin within the bore. The bore is cut perpendicularly with the base of the nut and adjacent to the face B, and when the pin is fixed in the bore, it will extend perpendicular with the base of the nut, and will project a short distance below the said base as most clearly indicated in Figs. 3 and 4.

In practice I prefer to have the end of the pin project about one-eighth of an inch beyond the base of the nut, but this is a matter which can of course be regulated according to the use to which the nut is to be put. When the nut is screwed down, the end of the pin will come in contact with the face of the fish-plate or washer or other bearing surface and from the moment that the pin contacts with said plate the nut is locked against reverse movement. As the operation of screwing the nut is continued the pin is bent to one side as shown, but the end will always be held in firm contact with the bearing surface, inasmuch as the said pin is a spring pin and its inherent elasticity will always hold its free end in contact with the bearing surface, and if the bolt or plate should wear, this wear will be taken up by the spring pin as it will be understood that the moment the nut and bearing surface are separated, the spring in its tendency to assume its normal perpendicular position, will be in firm contact with the bearing surface and consequently the locking pin will always hold the nut against reverse movement as long as its end is in contact with the bearing surface.

When it is desired to remove the nut, the end of the pin can be pressed away from the washer or fish-plate and the nut turned back. The spring pin will normally resume its original perpendicular position, but if for any reason the said pin should become so bent as to be unfit for further use, it can be easily pulled out and another pin quickly and easily inserted, and workmen can be supplied with a quantity of these pins for the purpose of replacing any pin which might prove defective.

It will thus be seen that I provide an exceedingly cheap and simple, and at the same time a durable and efficient construction of nut lock.

Having thus fully described my invention, what I claim as new and desire to secure by Letters Patent is:—

A nut having one corner thereof cut away for a portion of its thickness providing a projecting shoulder, said shoulder having a bore provided therein which bore is perpendicular to the base of the nut, a spring steel locking pin adapted to be inserted in the said bore, a piece of soft metal inserted in the bore before the end of the pin is driven home, said end of the pin being slightly flattened, said pin being of such length that when one end is inserted in the bore the opposite end will project a short distance beyond the base of the nut, substantially as described.

GEORGE BRYAR.

Witnesses:
   CHAS. E. BROCK,
   EDGAR B. MCBATH.